United States Patent [19]
Hosono

[11] Patent Number: 5,523,190
[45] Date of Patent: Jun. 4, 1996

[54] MAGNETIC TONER AND RECORDING METHOD

[75] Inventor: Nagao Hosono, Hachioji, Japan

[73] Assignee: Canon Kabushiki Kaisha, Tokyo, Japan

[21] Appl. No.: 355,494

[22] Filed: Dec. 14, 1994

Related U.S. Application Data

[62] Division of Ser. No. 157,433, Nov. 26, 1993, Pat. No. 5,407,769, which is a continuation of Ser. No. 557,014, Jul. 25, 1990, abandoned.

[30] Foreign Application Priority Data

Jul. 28, 1989  [JP]  Japan ................ 1-195622
Jul. 28, 1989  [JP]  Japan ................ 1-195624

[51] Int. Cl.⁶ .................................................. G03G 13/16
[52] U.S. Cl. .................................................. 430/124
[58] Field of Search ........................ 430/124, 106.6, 430/109, 903, 39; 427/130

[56] References Cited

U.S. PATENT DOCUMENTS

| | | | |
|---|---|---|---|
| 2,297,691 | 10/1942 | Carlson | 430/99 |
| 3,853,552 | 12/1974 | Namika | 430/124 |
| 4,293,627 | 10/1981 | Murphy et al. | 430/124 |
| 4,474,866 | 10/1984 | Ziolo | 430/106.6 |
| 4,740,443 | 4/1988 | Nakahara et al. | 430/106.6 |
| 4,978,595 | 12/1990 | Anno et al. | 430/106.6 |
| 4,990,424 | 2/1991 | Van Dusen et al. | 430/106.6 |
| 5,004,665 | 4/1991 | Ohtani et al. | 430/106.6 |

FOREIGN PATENT DOCUMENTS

| | | | |
|---|---|---|---|
| 62-11863 | 1/1987 | Japan | 430/106.6 |
| 62-206580 | 9/1987 | Japan . | |
| 62-294260 | 12/1987 | Japan | 430/106.6 |
| 63-256766 | 10/1988 | Japan | 430/106.6 |

OTHER PUBLICATIONS

Draft Collections 1IK04 and 1IK08 of Japan Chemical Society (Spring 1989). Polymer Processing, vol. 38 (7), 1989, pp. 314–319.

*Primary Examiner*—Christopher D. Rodee
*Attorney, Agent, or Firm*—Fitzpatrick, Cella, Harper & Scinto

[57] ABSTRACT

A magnetic toner comprises toner particles containing an organic magnetic resin.

A method of recording an image, comprises the steps of;
(a) bringing a magnetic developer into support on a developer-holding member having therein a magnetic-field generation means; the magnetic developer comprising toner particles containing an organic magnetic resin capable of being softened by heating and heat-curable at a temperature higher than its softening temperature;
(b) transporting the magnetic developer to a developing area of a latent image holding member disposed opposingly to said developer-holding member;
(c) developing a latent image to form a toner image;
(d) transferring the toner image to a recording paper; and
(e) heating the transferred toner image to a temperature higher than the softening temperature of the organic magnetic resin so that the toner image is fixed to the recording paper.

7 Claims, 2 Drawing Sheets

MAGNETIC TONER AND RECORDING METHOD

This application is a division of application Ser. No. 08/157,433, filed Nov. 26, 1993, now U.S. Pat. No. 5,407,769, issued Apr. 18, 1995; which in turn, is a continuation of application Ser. No. 07/557,014, filed Jul. 25, 1990, now abandoned.

BACKGROUND OF THE INVENTION

1. Field of the Invention

The present invention relates to a magnetic toner having superior coloring properties, and a recording method making use of a magnetic developer comprising the magnetic toner. The present invention also relates to a recording method using a developer comprising a magnetic toner having superior coloring properties.

2. Related Background Art

Previous one-component magnetic developers commonly contain opaque metal ferromagnetic particles in the inner parts of toner particles primarily composed of a thermoplastic resin. These one-component developers are suitable for making a record of a magnetic image with a black or a dull color. It, however, has been difficult for such a developer to make a record with a bright color.

SUMMARY OF THE INVENTION

An object of the present invention is to provide a magnetic toner having superior coloring properties and capable of making a record of an image with a clear color.

Another object of the present invention is to provide a magnetic toner having a magnetic attraction force.

Still another object of the present invention is to provide a magnetic toner having a magnetic attraction force and which is free from impairment of light transmission properties.

A further object of the present invention is to provide a magnetic toner having a given color without use of any special coloring agent.

A still further object of the present invention is to provide a magnetic toner capable of having any desired color.

A still further object of the present invention is to provide a novel recording method that can obtain a toner image with a bright color, using a magnetic developer having superior coloring properties.

A still further object of the present invention is to provide a recording method for forming a flexible toner image on recording paper.

A still further object of the present invention is to provide a recording method that causes minimal offset.

A still further object of the present invention is to provide a recording method that can perform faithful development and can record an image having superior light transmission properties.

The objects of the present invention can be achieved by a magnetic toner comprising an organic magnetic resin.

The objects of the present invention can also be achieved by a method of recording an image, comprising the steps of;

(a) bringing a magnetic developer into support on a developer-holding member having therein a magnetic-field generation means; said magnetic developer comprising toner particles containing an organic magnetic resin capable of being softened by heating and heat-curable at a temperature higher than its softening temperature;

(b) transporting said magnetic developer to a developing area of a latent image holding member disposed opposingly to said developer-holding member;

(c) developing a latent image to form a toner image;

(d) transferring said toner image to a recording paper; and (e) heating the transferred toner image to a temperature higher than the softening temperature of said organic magnetic resin so that the toner image is fixed to said recording paper.

DESCRIPTION OF THE PREFERRED EMBODIMENTS

Figure 1:
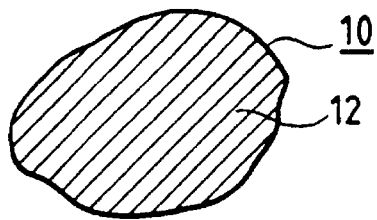
FIG. 1 is a schematic cross-sectional view to show a first embodiment of the magnetic toner of the present invention.

As the organic magnetic resin contained in the magnetic toner of the present invention, it is possible to use an organic magnetic resin adapted to the desired magnetic characteristics, which can be produced by subjecting, for example, a pyrene-aromatic aldehyde, condensed polycyclic polynuclear aromatic compound (COPNA resin) having a triaryl methyl structure, to a known photo-dehydrogenation process or a discharge process to have an unpaired electron structure so that necessary spins can be sufficiently set up. This resin is disclosed, for example, in draft collections 1IK04, 1IK07, 1IK08, etc. of Japan Chemical Society (Spring, 1989). In particular, the synthesis of COPNA resins is described in draft collection 1IK07. As described there, a COPNA resin is synthesized from a condensed polycyclic aromatic compound and an aromatic aldehyde. For example, phenol and resorcinol can be used as the starting aromatic compounds (Aro), and benzaldehyde (BA), terephthaladehyde (TPA) or isophthaladehyde (IPA) can be used as the crosslinking agent. To a mixture of a starting material (Aro) and 1.25 mole equivalent of the crosslinking agent, 1% by weight of p-toluenesulfonic acid can be added and mixed sufficiently. The reaction mixture can be heated and kept at 130° C. in an argon stream. The reaction can be stopped when the mixture becomes viscous and begins to lose its fluidity. Thereby a B-stage resin is obtained.

The B-stage resin can be treated in one of two ways. One treatment involves photodehydrogenation. In this method, 1 g of the B-stage resin can be placed in a quartz test tube protected from light irradiation. Then a photosensitizing agent such as p-benzoquinone (BQ), dichlorodicyanobenzoquinone (DDQ) or the like can be added thereto in an amount equimolar to the structure unit of the resin. The mixture of B-stage resin and photosensitizing agent can then be dissolved in an organic solvent, and the solution exposed to light by means of a high-pressure mercury lamp. After the light exposure, the sample can be separated and extracted with an organic solvent to obtain the dehydrogenated resin.

The other method of treating the B-stage resin is by an electric discharge. According to this method, to 0.5 g of the powdered resin can be added 0.1 ml of 3% hydrogen peroxide solution. The thus-treated resin can be fixed in an electric discharge system employing an ultra-high purity graphite electrode and a high power-factor neon transformer as the power source for atomic absorption analysis. While the system is being evacuated, the resin is exposed to electric discharge for several minutes. After the electric discharge, the resin is washed sufficiently and dried spontaneously.

Resins derived from phenol or resorcinol as an aromatic material and the respective aromatic aldehyde as a crosslinking agent exhibit a peak of methine carbon around 50 ppm in $^{13}C$ NMR spectrum, evidencing the following triarylmethine structure as the main backbone:

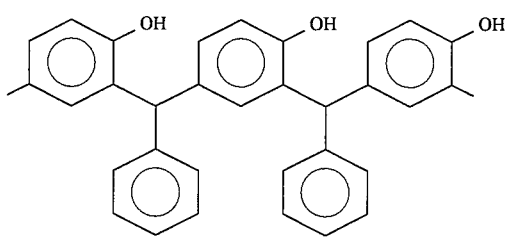

The present invention will be described below in detail with reference to the accompanying drawings.

A magnetic toner 10 shown in FIG. 1, according to a first embodiment of the present invention, is comprised of a toner particle formed of a resin 12 having magnetic properties, comprising i) an organic magnetic resin capable of being softened by heating and heat-curable at a temperature higher than its softening point or ii) a mixed resin of such an organic magnetic resin and a non-magnetic thermoplastic resin, mainly composed of the organic magnetic resin.

The magnetic toner 10 may be colored with the organic magnetic resin contained, or can be incorporated with another coloring agent, such as a dye, so that it is colored to have any desired hue. Known dyes or pigments can be used as the above coloring agent. Examples thereof are Phthalocyanine Blue, Indanthrene Blue, Peacock Blue, Permanent Red, Lake Red, Rhodamine Lake, Hanza Yellow, Permanent Yellow, and Benzidine Yellow.

The magnetic toner 10 may also be incorporated with a ferromagnetic metal (including metal ions) of single metal such as iron, nickel or cobalt, or alloy thereof, having a particle size not greater than the wavelength of visible light, in order to supplement magnetic characteristics. In such an instance, a sufficient magnetic attraction force can be produced in the direction of a developer-holding member. Therefore spatters of developer can be lessened and also agglomeration between toner particles can be prevented, making it possible to carry out especially faithful image development. At the same time, even when the toner is incorporated with the ferromagnetic metal (including metal ions) having a particle size not greater than the wavelength of visible light, light transmission properties are not impaired thereby, and hence it is possible to make a record of an organic magnetic resin image with a bright color, because of superior coloring properties and color reproducibility.

Figure 2:
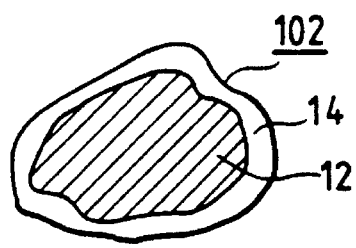
FIG. 2 is a schematic cross-sectional view to show a second embodiment of the magnetic toner of the present invention.

A magnetic toner 102 shown in FIG. 2, according to a second embodiment of the present invention, is comprised of a toner particle having a capsule structure (or core-shell structure) comprising a core 12 and a shell 14 that covers the periphery of the core. The core is formed of a resin 12 having the properties of a magnet, comprising i) an an organic magnetic resin capable of being softened by heating and heat-curable at a temperature higher than its softening point or ii) a mixed resin of such an organic magnetic resin and a non-magnetic thermoplastic resin, mainly composed of the organic magnetic resin. The shell is formed of a non-magnetic thermoplastic resin.

Like the magnetic toner 10, the magnetic toner 102 may have been colored with the organic magnetic resin contained, or can be additionally incorporated with another coloring agent such as a dye so that it is colored to have an desired hues. It may also be incorporated with an inorganic magnetic material.

If necessary, the toner particle having the capsule structure may be formed using the non-magnetic thermoplastic resin for the cope and using the organic magnetic resin for the shell.

Figure 3:
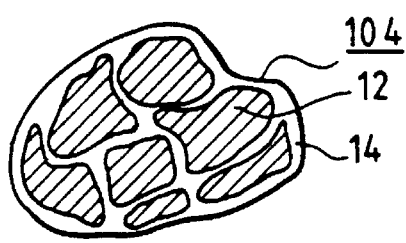
FIG. 3 is a schematic cross-sectional view to show a third embodiment of the magnetic toner of the present invention.

A magnetic toner 104 shown in FIG. 3, according to a third embodiment of the present invention, is comprised of a toner particle in which a resin 12 having the properties of a magnet, comprising i) an organic magnetic resin capable of being softened by heating and heat-curable at a temperature higher than its softening point or ii) a mixed resin of such an organic magnetic resin and a non-magnetic thermoplastic resin, mainly composed of the organic magnetic resin, is dispersed in a non-magnetic thermoplastic resin 14 in t-he form of particles.

Like the magnetic toner 10, the magnetic toner 104 may have been colored with the organic magnetic resin contained, or can be additionally incorporated with another coloring agent, such as a dye, so that it is colored to have any desired hue. It may also be incorporated with an inorganic magnetic material.

Figure 4:
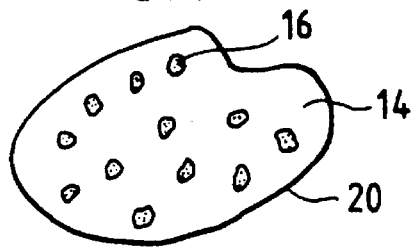
FIG. 4 is a schematic cross-sectional view to show a magnetic toner of the prior art.

FIG. 4 illustrates a conventional magnetic toner, in which inorganic ferromagnetic powder 16 of $Fe_3O_4$ or the like is dispersed in the inner part of a thermoplastic resin 14, which resin also plays a role as a dye serving as the coloring agent and may color the inorganic ferromagnetic powder depending on the purpose. In this instance, however, it is difficult to produce a bright color.

Figure 5:
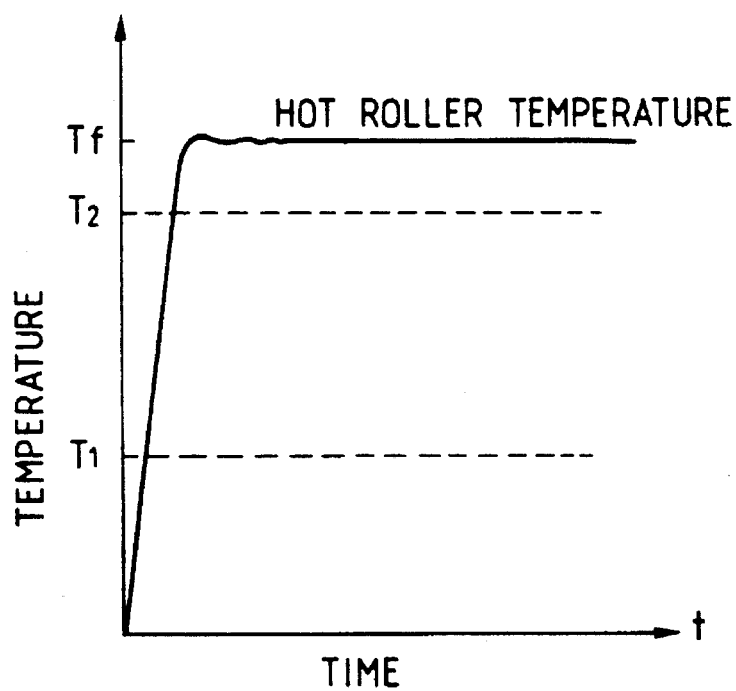
FIGS. 5 and 6 are graphs to show the relationship between a roller temperature T and a time t of a hot-roller fixing device of a recording apparatus shown in FIG. 7.
Figure 6:
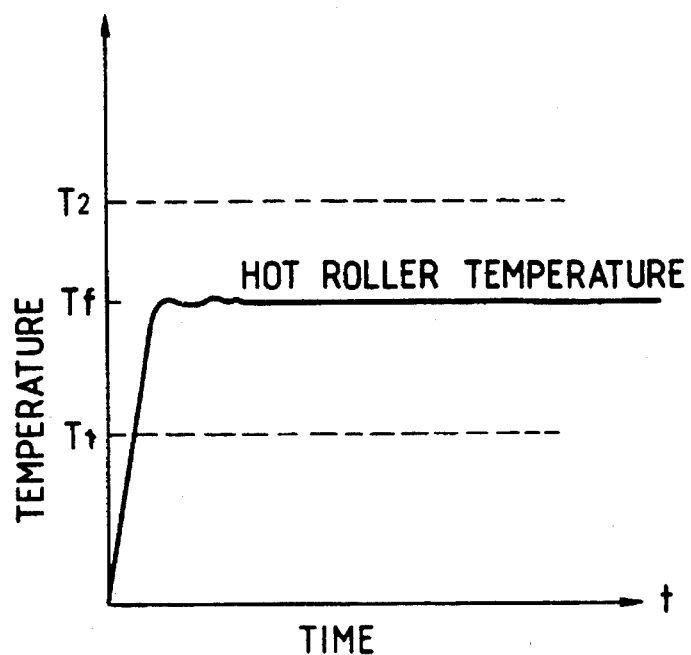
Figure 7:
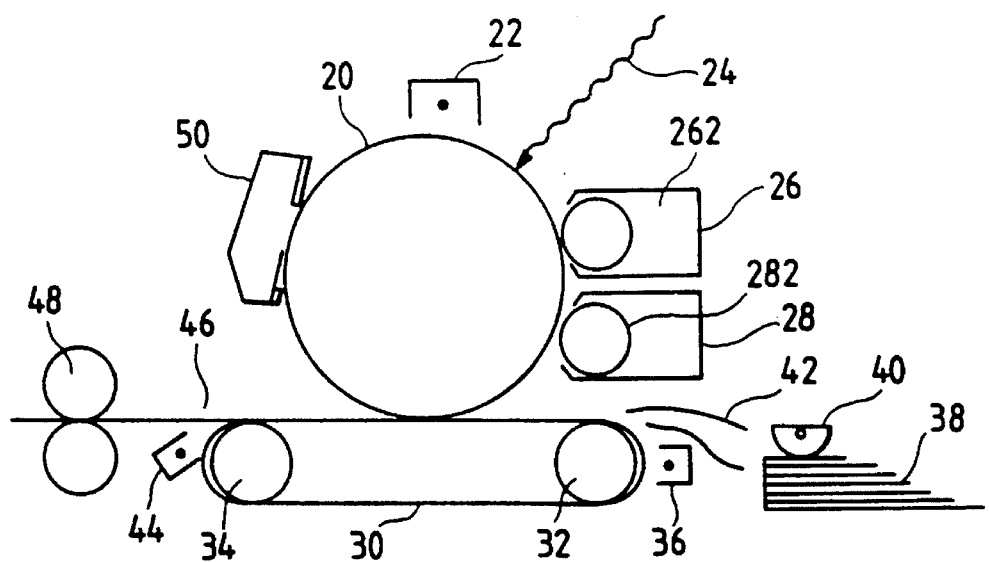
FIG. 7 schematically illustrates a recording apparatus used in the present invention.

FIGS. 5 and 6 each show a fixing temperature $T_f$ at which a toner image formed using the above organic magnetic resin capable of being softened by heating and heat-curable at a temperature higher than its softening point can be fixed on a recording paper, and, stated in more detail, show a temperature T of a heat-controlled heat roller of a heat-roller fixing device of the apparatus shown in FIG. 7, with respect to a time t. The temperature can be satisfactorily controlled by known methods. For example, the method as disclosed in Japanese Unexamined Patent Publication No. 206580/1987 may be used. In the instance as shown in FIG. 5, the hot roller temperature T rises at T=0, and is controlled to be within the range of temperatures higher than the softening temperature $T_1$ of the organic magnetic resin and not lower than the curing temperature (or thickening) $T_2$ of the organic magnetic developer, where the toner image formed is fixed. In the instance as also shown in FIG. 6, the hot Poller temperature T rises at T=0, and is controlled to be within the range of temperatures higher than the softening temperature $T_1$ of the organic magnetic resin and lower than the curing (or thickening) temperature $T_2$ of the organic magnetic developer, where the toner image formed is fixed. In both instances, the hot roll temperature is controlled at a temperature higher than the softening temperature $T_1$ of the organic magnetic resin. Here, T means a fixing temperature, and is by no means limited only to the hot roller temperature.

FIG. 7 schematically illustrates a recording apparatus used in the present invention. The numeral 20 denotes an electrostatic latent image holding member comprising an electrophotographic photosensitive member; 22, a charger; 24, imagewise exposure; 26 and 28, development devices; 262 and 282, developer holding members (development rollers) having therein magnetic field generation means; 30, an endless transfer belt; 32 and 34, drive rollers; 36, a charger for charging the transfer belt; 38, a paper feed tray; 40, a paper feed roller; 42, a paper feed guide; 44, a discharger for separating a recording paper 46 from the transfer belt; 48, a hot roller fixing device; and 50, a cleaning device. The electrostatic latent image formed on the electrostatic latent image holding member 20 is developed by means of the developing device 26 or 28 at every time the electrostatic latent image holding member 30 is rotated. The recording paper 46 fed to the charged surface of the transfer belt 30 through the paper feed guide 42 is electrostatically stuck on the transfer belt 30, and delivered with the movement of the rotating transfer belt 30. At a proximate contact point with the electrostatic latent image holding member 20 comprising an electrophotographic photosensitive member, the toner images formed on the electrostatic latent image holding member 20 are repeatedly transferred necessary times. Toner images having different colors according to the time of transfer or the part on a picture formed are overlappingly transferred. Thereafter, the recording paper 46 having an unfixed-toner image on its surface is separated by weakening the charge on the transfer belt 30 by means of the discharger 44, forwarded to the hot roller fixing device 48, and fixed there. The fixing temperature at this stage is controlled within the temperature range as shown in FIGS. 5 or 6, at the temperature of which the toner image is fixed.

The present invention will be more specifically described in the following Examples.

Examples 1 to 10

Used as the organic magnetic resin was the organic magnetic resin produced by subjecting a pyrene-aromatic aldehyde, condensed polycyclic polynuclear aromatic compound (COPNA resin) having a triaryl methyl structure, to a known photo-dehydrogenation process or a discharge process to have an unpaired electron structure so that necessary spins can be sufficiently set up, as disclosed in draft collections 1IK04, 1IK07, 1IK08 of Japan Chemical Society (Spring, 1989). This resin softened at temperatures of from 55° to 60° C. ($T_1$=55° to 60° C.) and cured at temperatures higher than 220° C. or more. Organic magnetic resins richly-colored in red and yellow were obtained even with a slight metal ion content (e.g., Fe ion content). Particles of this resin having a particle size of about 12 μm were capable of sufficiently attracted by a magnetic force to the surfaces of the developer holding members 262 and 282 having therein the magnetic field generation means.

In the case of a ferromagnetic metal powder in which metal ions contained are, for example, Fe ions, a effect was obtained which strengthens and supplements the magnetic force acting on the resulting organic magnetic resin particles.

The non-magnetic thermoplastic resin also used was a styrene resin having a softening temperature of about 60° C. Into the above organic magnetic resin, this non-magnetic thermoplastic resin was mixed in an amount of 5, 10, 20 or 30% in weight ratio based on the total resin weight to prepare magnetic toners, each having a curing temperature or thickening temperature $T_2$ ranging from 170° C. to 185° C. Accordingly, toner images were fixed at a fixing temperature $T_f$ of 195° C. corresponding to $T_f>T_2>T_1$, or 145° C. corresponding to $T_2>T_f>T_1$.

When the non-magnetic thermoplastic resin was mixed in such an amount that the organic magnetic resin was contained in an amount of less than 50% in weight ratio, the particles having a particle diameter of about 12 μm were not attracted by the magnetic force to the surfaces of the developer holding members 262 and 282. Thus, it was found that the magnetic toner should have the component ratio such that the organic magnetic resin is in an amount of not less than 50% in weight ratio based on the total resin weight. In the magnetic toner mainly composed of the organic magnetic resin, the terms "mainly composed" are used in this meaning. This is different from conventional magnetic toners, and is important from the viewpoint that a magnetic force can be uniformly applied to the whole or substantially the whole and the magnetic significance of employing the organic magnetic resin can be meaningfully retained. This is because a magnetic force relying on the particle diameter can be surely applied even if the toner particles have been further destroyed to become smaller in size.

Using developers comprising organic magnetic toners in which the component ratios of the organic magnetic resin described above and other non-magneticthermoplastic resin were varied as shown in Table 1, toner images developed and recorded were fixed by hot roller fixing (contact fixing) without application of oil, under fixing conditions of:

(1) $T_f>T_2>T_1$, $T_f$=195° C., or (2) $T_2>T_f>T_1$, $T_f$=145° C.

Results obtained are shown together in Table 1.

TABLE 1

| Example | Thermoplastic resin (wt %) | Fixing temp. | Offset on hot roller | Toner image flexibility | Coloring properties | Overall evaluation |
| --- | --- | --- | --- | --- | --- | --- |
| 1 | 0% | $T_2 > T_f > T_1$ | B | A | AA | A' |
| 2 | 0% | $T_f > T_2 > T_1$ | A | A' | AA | AA |
| 3 | 5% | $T_2 > T_f > T_1$ | B | AA | AA | A |
| 4 | 5% | $T_f > T_2 > T_1$ | A | A | AA | AA |
| 5 | 10% | $T_2 > T_f > T_1$ | B | AA | AA | A |
| 6 | 10% | $T_f > T_2 > T_1$ | A | A | AA | AA |
| 7 | 20% | $T_2 > T_f > T_1$ | B | AA | AA | A |
| 8 | 20% | $T_f > T_2 > T_1$ | A | AA | AA | AA |
| 9 | 30% | $T_2 > T_f > T_1$ | B | AA | AA | A |
| 10 | 30% | $T_f > T_2 > T_1$ | A' | AA | AA | AA |

AA: Excellent, A: Very good, A': Good
B: Satisfactory for practical use
C: Unsatisfactory for practical use As be seen from the results shown in Table 1, Examples 1 to 10 all proved "Excellent" in respect of the coloring properties, and were at least as good as they were satisfactory for practical use in respect of the offset on hot roller and the flexibility of fixed image. They were overall evaluated as "considerably good", which is better than "all satisfactory for practical use". They were also found to have the following features depending on the fixing temperatures: In the case when the recording was carried out under fixing conditions of (1) $T_f>T_2>T_1$, $T_f=195°$ C., the offset of the toner resin on the hot roller was very effectively prevented. This is because the toner resin that forms a toner image at the time of fixing is released from the hot roller (a heat-conductive contact body) in the state it has been cured or thickened after softened and hence the toner resin is adhered to the hot roller (a heat-conductive contact body) with difficulty.

In the case when the recording was carried out under fixing conditions of (2) $T_2>T_f>T_1$, $T_f=145°$ C., the fixed recorded image showed a flexibility, and was well kept fixed even when rubbed. This is because the fixing temperature made not lower than the heat-curing temperature or thickening temperature has prevented the toner from becoming brittle.

It was also found that the component ratio of the non-magnetic thermoplastic resin in the toner resin should preferably be less than 50%, and more preferably not more than 20%, from the viewpoint of offset properties.

Organic ferromagnetic toner images having different colors were overlappingly recorded on a recording paper. As a result, it was possible to obtain a mixed-color image with an excellently bright color. This image was a toner image rich in color brightness that has not been obtained by a conventional magnetic developer containing therein an inorganic ferromagnetic material. The same is applied to a toner image formed of a single color.

Examples 11 and 12

Magnetic toners were prepared in the same manner as in the above Examples except that the styrene resin having a softening temperature of about 60° C. used therein was replaced by a styrene resin having a softening temperature of about 100° C. The magnetic toners thus obtained each had a curing temperature or thickening temperature $T_2$ ranging from 215° C. to 225° C. Using developers comprising the magnetic toners, toner images developed and recorded were fixed by hot roller fixing (contact fixing) without application of oil, under fixing conditions of:

(1) $T_2>T_f>T_1$, $T_f=135°$ C.
(2) $T_f>T_2>T_1$, $T_f=230°$ C., or

Results obtained are shown together in Table 2.

TABLE 2

| Example | Thermoplastic resin (wt %) | Fixing temp. | Offset on hot roller | Toner image flexibility | Coloring properties | Overall evaluation |
| --- | --- | --- | --- | --- | --- | --- |
| 11 | 10% | $T_2 > T_f > T_1$ | A' | AA | AA | AA |
| 12 | 10% | $T_f > T_2 > T_1$ | A | A' | AA | A |

As will be seen from the results shown in Table 1, Examples 11 and 12 both proved "Excellent" in respect of the coloring properties, and were at least on the level which was better than "considerably good" in respect of the offset on hot roller and the flexibility of fixed image. They were overall evaluated as being on the level of "very good" or higher.

Comparative Examples 1 and 2

Using magnetic developers comprising magnetic toners of Comparative Examples 1 and 2 which were prepared by substituting the resin materials as shown in Table 3 for the toner particles comprising the organic resins in Examples 1 to 12, roller fixing was carried out in the same manner as the above Examples under fixing conditions of a temperature range higher than the softening temperature of the resin that forms the respective toner particles. Results obtained are shown in Table 3.

TABLE 3

| Comparative Example | $T_1$ | Fixing temp. | Offset on hot roller | Toner image flexibility | Coloring properties | Overall evaluation |
| --- | --- | --- | --- | --- | --- | --- |
| 1* | 130° C. | 230° C. | B | A | C | B |
| 2** | 130° C. | 210° C. | B | A | C | B |

Magnetic toner materials:
*Styrene-acrylate copolymer/phthalocyanine/magnetite (36 wt. %)
**Styrene-acrylate copolymer/phthalocyanine/magnetite (36 wt. %)

As will be seen from the results shown in Table 3, colors excellent in brightness were not obtainable in both Comparative Examples 1 and 2, both of which were evaluated as "unsatisfactory for practical use".

What is claimed is:

1. A method of recording an image, comprising the steps of:
   (a) supporting a magnetic developer on a developer-holding member having therein a magnetic-field generation means; said magnetic developer comprising toner particles containing an organic magnetic resin capable of being thickened by heating and heat-curable at a temperature higher than its softening temperature, wherein said organic magnetic resin has a dehydrogenated triaryl methyl structure;
   (b) transporting said magnetic developer to a developing area in which said magnetic developer is given from said developer holding member to a latent image holding member;
   (c) developing a latent image to form a toner image;
   (d) transferring said toner image to a recording paper; and
   (e) heating the transferred toner image to a temperature higher than the softening temperature of said organic magnetic resin so that the toner image is fixed to said recording paper.

2. A method of recording an image according to claim 1, wherein the transferred toner image is heated within a temperature range of from a temperature higher than the softening temperature of said organic magnetic resin to a temperature lower than the heat-curing temperature or thickening temperature thereof.

3. A method of recording an image according to claim 2, wherein the recording is carried out using toner particles containing a ferromagnetic metal having a particle size not greater than the wavelength of visible light.

4. A method of recording an image according to claim 3, wherein the transferred toner image is heated within a range of a temperature not lower than the heat-curing temperature or thickening temperature of the organic magnetic resin.

5. A method of recording an image according to claim 1, wherein the recording is carried out using toner particles containing a ferromagnetic metal having a particle size not greater than the wavelength of visible light.

6. The method of recording an image according to claim 1, wherein said toner particles contain said organic magnetic resin and a non-magnetic thermoplastic resin.

7. The method of recording an image according to claim 6, wherein said non-magnetic thermoplastic resin is contained in an amount of 5% by weight or more based on the total resin weight.

* * * * *